(12) United States Patent
Harada et al.

(10) Patent No.: US 6,223,601 B1
(45) Date of Patent: *May 1, 2001

(54) VIBRATION WAVE DETECTING METHOD AND VIBRATION WAVE DETECTOR

(75) Inventors: Muneo Harada; Naoki Ikeuchi, both of Osaka (JP)

(73) Assignee: Sumitomo Metal Industries, Limited, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/316,833

(22) Filed: May 21, 1999

(30) Foreign Application Priority Data

May 22, 1998 (JP) .................................................. 10-141916
Apr. 30, 1999 (JP) .................................................. 11-125304

(51) Int. Cl.⁷ .................................................. G01H 11/00
(52) U.S. Cl. .................................................. 73/649; 310/321
(58) Field of Search .............................. 73/579, 651, 645, 73/646, 648, 661, 659, 649; 310/321, 322, 334

(56) References Cited

U.S. PATENT DOCUMENTS 5,856,722 * 1/1999 Haronian et al. ..................... 310/321
6,012,334 * 1/2000 Ando et al. ............................. 73/651
6,079,274 * 6/2000 Ando et al. ............................. 73/649

OTHER PUBLICATIONS

W. Benecke et al. "A Frequency–Selective, Piezoresistive Silicon Vibration Sensor" Digest of Technical Papers of Transducers, pp. 105–108, 1985.

E. Peeters et al. "Vibration Signature Analysis Sensors for Predictive Diagnostics" Proceedings of SPIE, vol. 3224, pp. 220–230, 1997.

* cited by examiner

Primary Examiner—Helen C. Kwok
(74) Attorney, Agent, or Firm—Barnes & Thornburg

(57) ABSTRACT

A vibration wave detector in which: a plurality of resonator beams, each having a different length and being allowed to resonate at a specific frequency, are provided; a piezoresistor is installed in each resonator beam; and the piezoresistors are parallel-connected so that vibration is converted to an electric signal by the piezoresistors so as to output the sum of vibration waveforms at the respective resonator beams. Utilizing the fact that the magnitude of strain is different depending on positions on the resonator beam, the installation position of the piezoresistor is adjusted on each of the resonator beams so as to set the level of an output signal from each frequency band at a desired level; thus, it becomes possible to control the gain of a specific frequency band.

21 Claims, 16 Drawing Sheets

(di CHANGE)

(di CHANGE)

VIBRATION WAVE DETECTING METHOD AND VIBRATION WAVE DETECTOR

BACKGROUND OF THE INVENTION

Vibration sensors of a resonator array type have been proposed in which: a plurality of resonators having different lengths (that is, different resonant frequencies) are arranged in the form of an array, and allowed to resonate selectively in response to a vibration wave such as a sound wave with specific frequencies for the respective resonators, and the resonance levels of the respective resonators are converted to electric signals so that intensities of the vibration wave for respective frequency bands are detected. (For example, W. Benecke et al., "A Frequency-Selective, Piezoresistive Silicon Vibration Sensor, Digest of Technical Papers of TRANSDUCERS" 85, pp. 105–108 (1985), or E. Peeters et al., "Vibration Signature Analysis Sensors for Predictive Diagnostics," Proceedings of SPIE '97, vol. 3224, pp-220–230 (1997)).

BRIEF SUMMARY OF THE INVENTION

In a conventional vibration sensor, a piezoresistor is formed at the base of a resonator, and changes in the resistance value of the piezoresistor, which occur due to vibrations (resonance) of the resonator, are detected by a Wheatstone bridge, etc. so that an electric output signal is taken out of the resonator. In particular, in the sensor disclosed in the latter document, the output signal is obtained while the Wheatstone bridge output from each resonator is being switched by a multiplexer.

In the vibration sensor of this type, there is a demand for controlling the gain (detection sensitivity) of a specific frequency band of an inputted vibration wave. In a conventional vibration sensor, in order to obtain such a detection sensitivity controlling function, it is necessary to provide a circuit construction which can subject the electric output signal obtained from each resonator to an amplifying process or a damping process at a succeeding step. This results in a problem of a large circuit scale as a whole.

When a resonator is supported as a cantilever beam, a strain in the resonator is the greatest at the foot thereof, and decreases toward the tip thereof. In the case when a piezoresistor is formed at the foot of each resonator at which the strain is the greatest, since the length of each resonator is different, the magnitude of strain at the foot of each resonator is different even if the amplitude at the tip of each resonator is the same. This is because even if the amplitude is the same, a shorter resonator has a greater strain, while a longer resonator has a smaller strain. The resulting problem is that even if the tip vibrates with the same amplitude, the level of an electric output signal differs depending on each of the resonators.

In accordance with the present invention, a detector such as a piezoresistor, installed in each of the resonators, is adjusted in its position so that it is possible to provide a vibration wave detecting method and a vibration wave detector which achieve a detection sensitivity controlling function by using a simple circuit construction.

Moreover, in accordance with the present invention, a detector such as a piezoresistor, installed in each of the resonators, is adjusted in its position so that it is possible to provide a vibration wave detecting method and a vibration wave detector which can easily make the levels of electric output signals in the resonators equal to each other.

Referring to one example of the present invention, the following description will briefly discuss the principle of the present invention. In the present invention, a plurality of resonators having respectively different resonant frequencies are arranged in the form of an array. In response to an inputted vibration wave, the respective resonators selectively react with resonant frequencies that the resonators own, and the intensities of respective frequency components in the vibration wave are detected as electric output signals by using piezoresistors installed in the respective resonators. In this case, taking it into account that the magnitude of a strain is different depending on portions of each resonator (in the case of a cantilevered resonator, greater on the foot and smaller at the tip thereof), the installation position of the piezoresistor is adjusted for each resonator in order to obtain an output signal having a desired level from the piezoresistor. In this manner, by adjusting the installation position of the piezoresistor in each resonator, it becomes possible to set a detection gain for each resonator. Moreover, this arrangement makes it possible to freely control the output gain of each resonator easily without the need for installing an amplifier at the succeeding step; thus, it becomes possible to obtain a desired frequency characteristic, and to realize a vibration wave sensor having a detection sensitivity controlling function by using a simpler arrangement as compared with a conventional sensor. Furthermore, it is possible to make the levels of electric output signals at the respective resonators equal to each other by adjusting the installation position of the piezoresistor in each of the resonators.

As described above, in accordance with the distribution of the sizes of strains in the respective resonators, the installation position of the piezoresistor in each of the resonators is adjusted so as to realize a detection sensitivity controlling function. Moreover, when each piezoresistor is installed at a position where the magnitudes of strains in the respective resonators are equal to each other, it becomes possible to obtain a flat frequency characteristic by making the levels of electric output signals of the respective resonators equal to each other.

Here, the piezoresistors of the respective resonators are parallel-connected and a voltage is applied to one end of the parallel circuit so as to take out the sum of the electric outputs of the respective resonators from the other end of the parallel circuit; thus, it is possible to simplify line connections.

Moreover, when a sound wave is used as the vibration wave to be detected, it is possible to realize an acoustic sensor having a detection sensitivity controlling function.

The above and further objects and features of the invention will more fully be apparent from the following detailed description with accompanying drawings.

DETAILED DESCRIPTION OF THE INVENTION

Referring to Figures, the following description will discuss embodiments of the present invention in detail. Here, an explanation will be given by exemplifying an acoustic sensor that uses a sound wave as a vibration wave to be detected.

Figure 1:
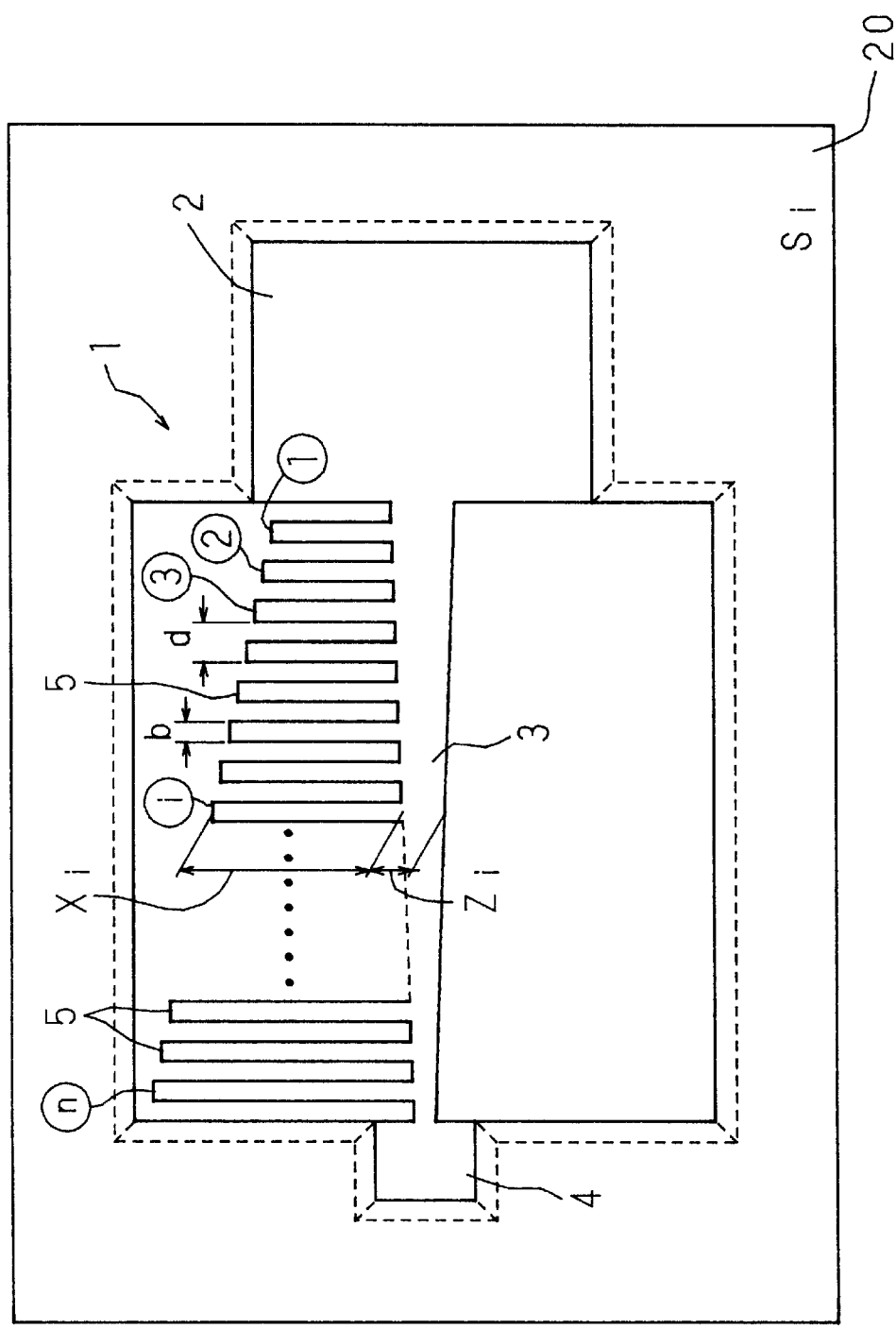
FIG. 1 is a plan view that shows one example of a sensor main body in a vibration wave detector of the present invention.

FIG. 1 is a plan view that shows one example of a sensor main body in a vibration wave detector (an acoustic sensor) of the present invention. The sensor main body 1, formed on a semiconductor silicon substrate 20, is constituted by a diaphragm 2 for receiving an inputted sound wave, a transversal beam 3 that is connected to the diaphragm 2, a terminator 4 connected to the tip of the transversal beam 3, and a plurality (n number) of resonator beams 5 each of which has one end supported by the transversal beam 3, and all of these parts are made of semiconductor silicon.

The width of the transversal beam 3 is widest at the end of the diaphragm 2, gradually narrowed toward the terminator 4 side, and becomes narrowest at the end of the terminator 4. Moreover, each resonator beam 5 is a resonator the length of which is adjusted so as to resonate at a specific frequency.

Each of these resonator beams 5 is allowed to selectively respond and vibrate at a resonant frequency f represent by the following equation (1):

$$f = (CaY^{1/2})/(X^2 s^{1/2}) \tag{1}$$

where

C: a constant experimentally determined;
a: the thickness of each resonator beam 5;
X: the length of each resonator beam 5;
Y: Young's modulus of the material substance (semiconductor silicon); and
s: the density of the material substance (semiconductor silicon).

As can be seen from the above-mentioned equation (1), the resonant frequency f of each resonator beam 5 is set at a desired value by changing its thickness a or its length X; thus, each resonator beam 5 has an inherent resonant frequency. In the present embodiment, the thickness a of all the resonator beams 5 is constant, and the length X thereof is successively increased from the right side (the diaphragm 2 side) toward the left side (the terminator 4 side); therefore, the resonant frequency at which each resonant beam 5 inherently vibrates is high at the right side (the diaphragm 2 side) and is gradually reduced toward the left side (the terminator 4 side).

Table 1 shows one example of specific specifications of the sensor main body 1 including n number of resonator beams 5. Here, the thicknesses of the diaphragm 2, the transversal beam 3 and the terminator 4 are the same as the thickness (a) of the resonator beam 5.

TABLE 1

| Parameter | Value |
| --- | --- |
| Number of resonator beams 5 (n) | 29 |
| Thickness (a) | 10 $\mu$m |
| Length of resonator beam 5 ($X_i$) | 2450$r^{i-29}$ $\mu$m |
| Width of resonator beam 5 (b) | 80 $\mu$m |
| Pitch of resonator beam 5 (d) | 120 $\mu$m |
| Width of transversal beam 3 ($Z_i$) | 60$r^{29-i}$ $\mu$m |

$r = 2^{1/48} = 1.0145$

In this case, the sensor main body 1 having the above-mentioned arrangement is formed on the semiconductor silicon substrate 20 by using a micromachining technique. In such an arrangement, when a sound wave is inputted to the plate shaped diaphragm 2, the diaphragm 2 is allowed to vibrate, and the vibrating wave representing the sound wave is transmitted to the transversal beam 3, and further transferred to the terminator 4 with the resonator beams 5, each of which has one end supported by the transversal beam 3, being successively allowed to resonate at their specific frequencies.

Figure 2:
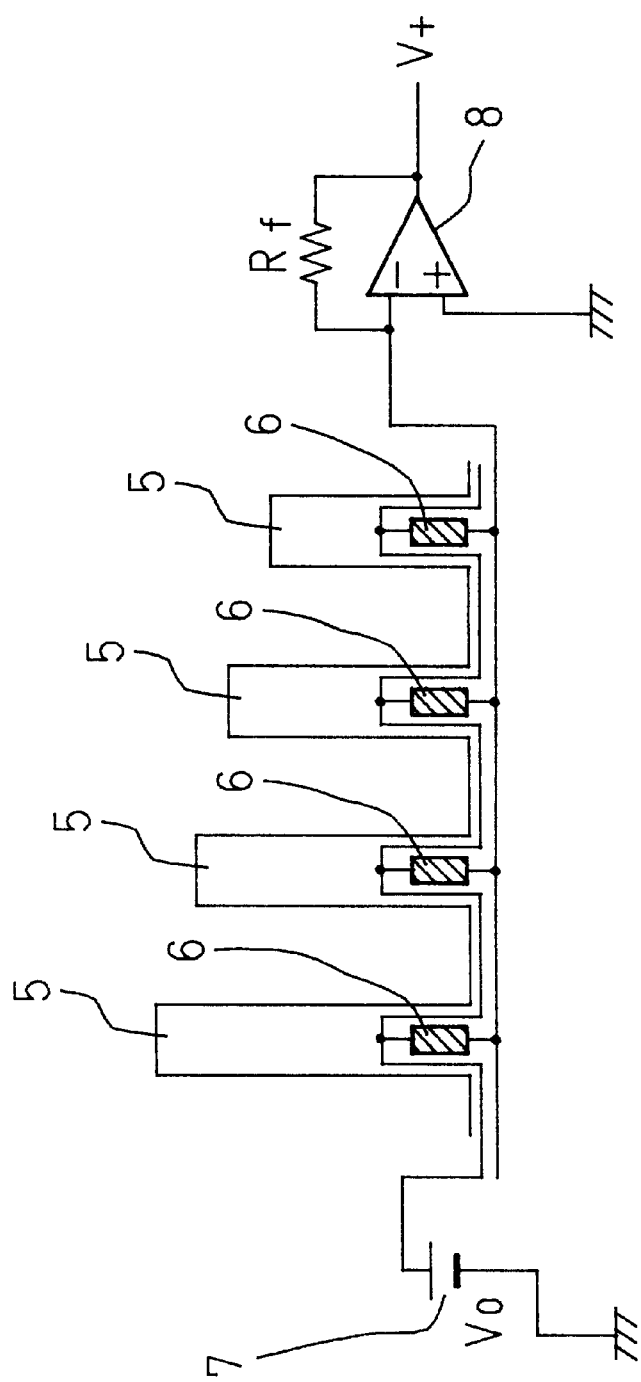
FIG. 2 is a circuit diagram that shows one example of the vibration wave detector of the present invention.

FIG. 2 shows a circuit diagram that shows a vibration wave detector (an acoustic sensor) of the present invention in which such a sensor main body 1 is used. A piezoresistor 6, made of polysilicon, is formed on a strain generating section (on the transversal beam 3 side) of each resonator beam 5 of the sensor main body 1. These plural piezoresistors 6 are connected in parallel with one another, and one end of the parallel circuit is connected to a DC power supply 7 (voltage $V_0$), and the other end thereof is connected to the minus input terminal of an operational amplifier 8. The operational amplifier 8 has its plus input terminal connected to ground. The DC power supply 7 commonly applies a bias voltage $V_0$ to all the resonant beams 5. When a specific resonator beam 5 is allowed to resonate, the resistance value of the corresponding piezoresistor 6 is changed due to a resulting strain, and the sum of these changes is obtained as an output from the operational amplifier 8.

Not shown in Figures, in another arrangement, the change in the resistance value of the piezoresistor in each of the resonators is drawn as an output from a Wheatstone bridge. The piezoresistor in each of the resonators serves as one resistor of the bridge, and the other fixed resistors are formed in the proximity of the input terminal of each operational amplifier by polysilicon in the same manner as the piezoresistor in each of the resonators, and connected. Here, in response to a change in the resistance value of the piezoresistor in each resonator, a current flows through the bridge so that the change is obtained as an output from each operational amplifier. Although this system makes the circuit scale larger, wiring is made so as to provide the respective outputs; therefore, even in the event of a trouble in one portion of the wiring, only the resonator output in the corresponding portion is adversely affected, while the other outputs are not affected, thereby making it possible to provide a sensor that is less susceptible to damage.

Figure 3:
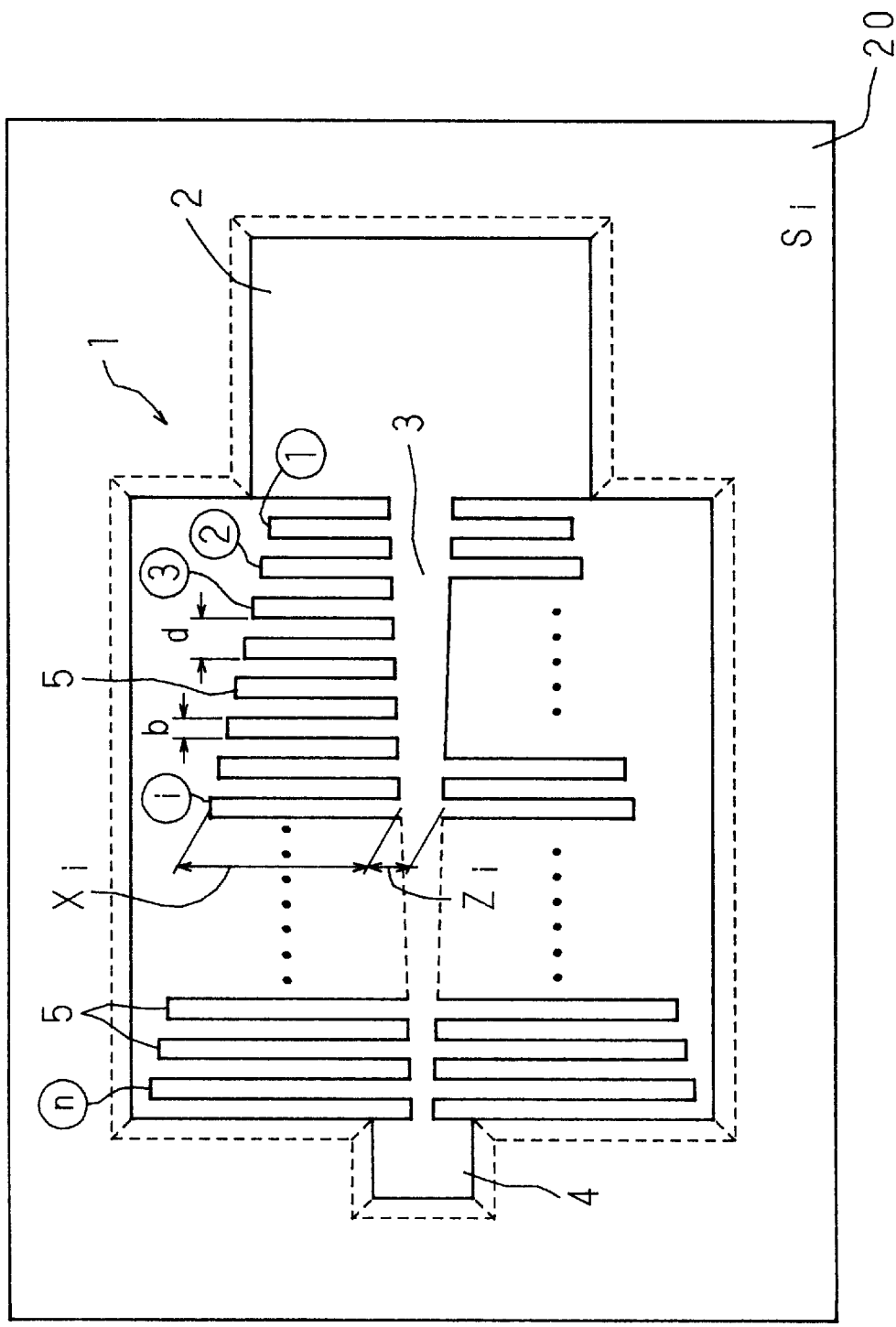
FIG. 3 is a plan view that shows another example of the sensor main body in the vibration wave detector of the present invention.

FIG. 3 is a plan view that show another example of the sensor main body 1 in the vibration wave detector (the acoustic sensor) of the present invention. In the above-mentioned example (FIG. 1), a plurality of resonator beams 5, the length of which is adjusted so as to resonate in response to a specific frequency, are placed only on one side of the transversal beam 3, however, in this example, n number of pairs of the resonator beams 5 having the same resonant frequency are placed on both sides of the transversal beam 3. In other words, each pair of the resonator beams 5, 5, which are connected to the same position of the transversal beam 3 in the length direction, have the same length and the same resonant frequency. The other members such as the diaphragm 2, the transversal beam 3 and the terminator 4 have the same arrangement as those of the above-mentioned example (FIG. 1).

Moreover, except that the number of the resonator beams 5 is doubled (2n number, for example, 29×2=58), the actual specifications are also the same as those of the above-mentioned example (FIG. 1, Table 1). That is, in the same manner as the above-mentioned example (FIG. 1), the thickness a of all the resonator beams 5 is constant, and the length X thereof is successively lengthened from the right side (the diaphragm 2 side) toward the left side (the terminator 4 side), with the result that the diaphragm 2 side forms a high-frequency side in the resonant frequency.

Figure 4:
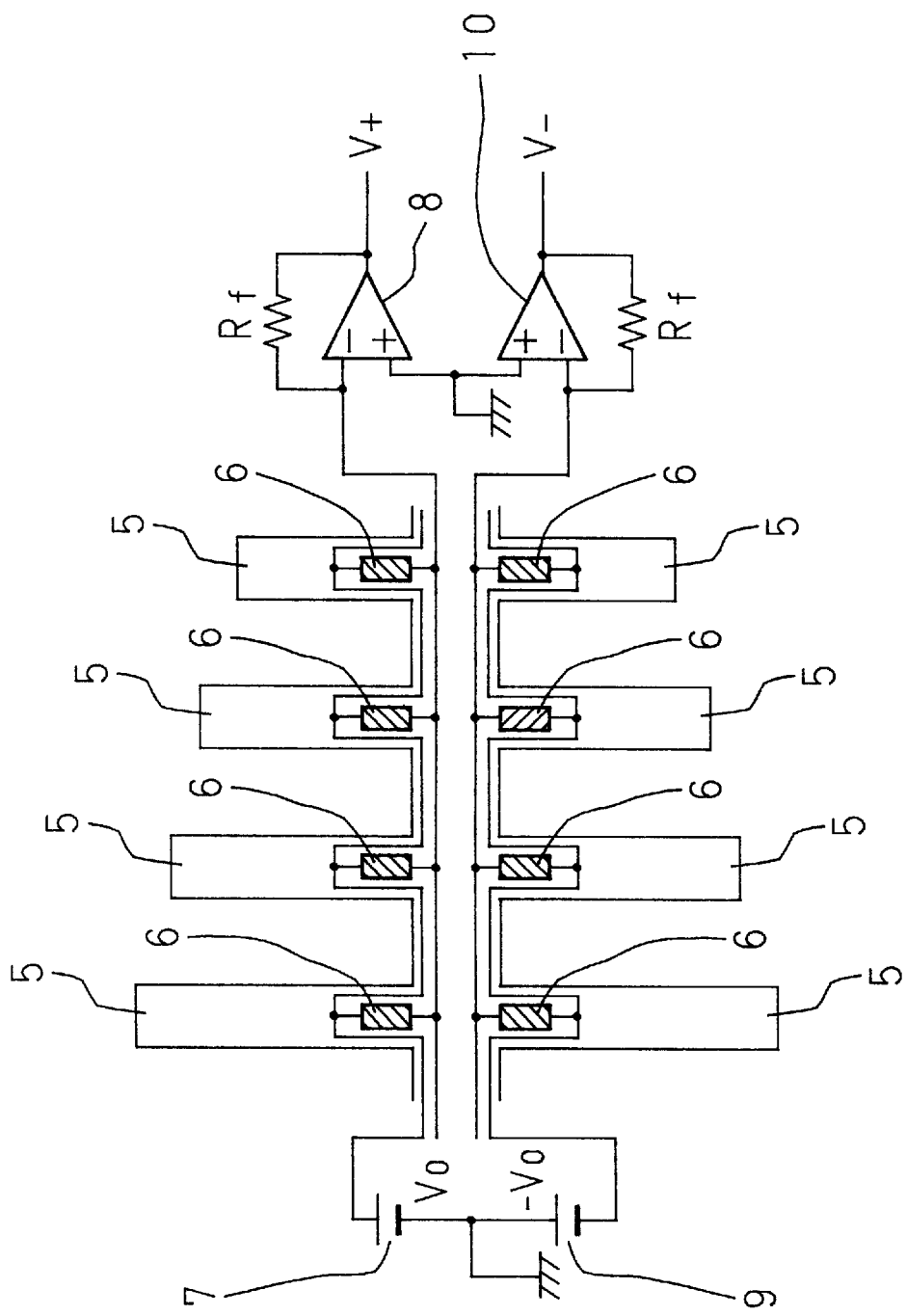
FIG. 4 is a circuit diagram that shows another example of the vibration wave detector of the present invention.

FIG. 4 is a circuit diagram that shows a vibration wave detector (an acoustic sensor) of the present invention in which such a sensor main body 1 is used. In FIG. 4, the same members as those of FIG. 2 are indicated by the same reference numerals. In this example, pairs of the resonator beams 5, 5, each pair having the same resonant frequency, are provided (that is, the fishbone structure); therefore, two pairs of parallel circuits to which the piezoresistors 6 are connected are provided, DC power supplies 7 and 9 for applying DC bias voltages $V_0$ and $-V_0$ to the respective parallel circuits are provided, and operational amplifiers 8 and 10 for getting output signals from the respective parallel circuits are provided. Thus, twice as much output is obtained by adding the output signals from the two-parallel circuits. Moreover, even in the event of any abnormality in one resonator beam 5 failing to provide its electric output signal, although the arrangement shown in FIG. 2 would cause a detection error, the arrangement shown in FIG. 4 makes it possible to provide an output signal having a corresponding frequency component by using the other resonator beam 5 paired by the resonator beam 5 having the abnormality, and consequently to prevent the detection error.

Also not shown in Figures, in the same manner as the above-mentioned example (FIG. 1), a detection means using a Wheatstone bridge may be proposed. Since the construction, etc. thereof are the same, the description thereof is omitted.

Here, the reasons that the piezoresistors 6 are used as a method for converting a mechanical vibration into an electric signal are because they are easily manufactured, because they have a linear conversion characteristic and because they have a high conversion efficiency.

Next, an explanation will be given of the operation. When a sound wave is inputted to the diaphragm 2 of the sensor main body 1 shown in FIG. 1 or FIG. 3, the plate-shaped diaphragm 2 is allowed to vibrate, and the energy of the vibrating wave representative of the sound wave is transmitted to each of the resonator beams 5 through the transversal beam 3, and successively absorbed by them from the high-frequency side toward the low-frequency side.

Figure 5:
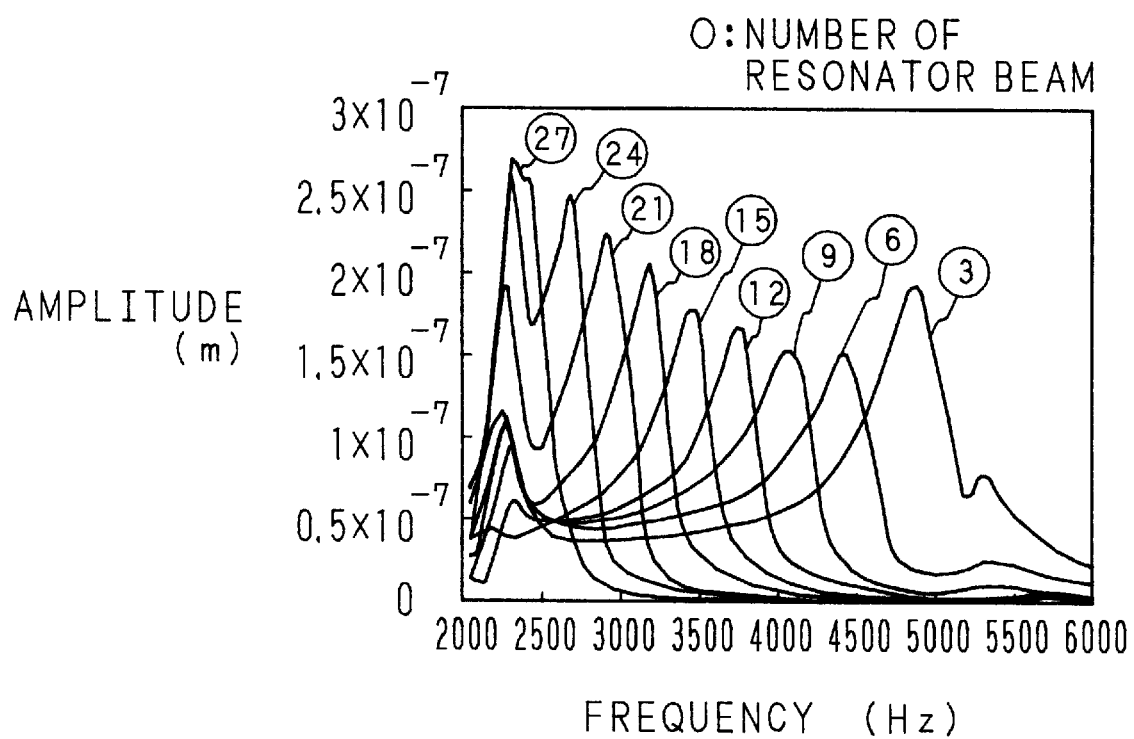
FIG. 5 is a graph that shows the results of simulation in the resonant beam frequency response of an FEM analysis in the vibration wave detector of the present invention.

FIG. 5 is a graph that shows the results of an FEM analysis in which the amplitude at the tip of each resonator beam 5 is simulated when a sound wave of 0.1 Pa is inputted to the diaphragm 2. The resonator beams 5 in the graph are successively numbered from the diaphragm 2 side. As can be seen from the graph, it is confirmed that the sensor main body 1 of the present invention has a superior frequency selectivity.

When such a resonance occurs in each resonator beam 5, the resistance value of the piezoresistor 6 formed in each resonator beam 5 is changed due to the strain. A constant bias voltage $V_0$ is applied to the respective parallel-connected piezoresistors 6 so that the changes in the resistance value of the piezoresistors 6, caused by the strain in each resonator beam 5, are added as electric currents flowing through one signal line.

In FIG. 4, the current I flowing through an imaginary ground in the operational amplifier 8 is represented by the following equation (2):

$$I = \sum_{i=1}^{n} \frac{V_0}{R_i + \delta R_i} \simeq \sum_{i=1}^{n} \frac{V_0}{R_i} - \sum_{i=1}^{n} \left(\frac{V_0}{R_i}\right)\left(\frac{\delta R_i}{R_i}\right) \quad (2)$$

where $R_i$: a constant term of the resistance of i-numbered resonator beam 5; and $\delta R_i$: a vibration term caused by a mechanical vibration on the i-numbered resonator beam 5.

Moreover, the output voltage $V_+$ of the operational amplifier 8 is represented by the following equation (3). In equation (3), the second term represents a variant voltage caused by a vibration.

$$V_+ = -\sum_{i=1}^{n} \frac{R_f V_0}{R_i} + \sum_{i=1}^{n} \left(\frac{R_f V_0}{R_i}\right)\left(\frac{\delta R_i}{R_i}\right) \quad (3)$$

where $R_1$: feedback resistance.

The ratio of a change in the resistance caused by the vibration is represented by equation (4), and the contribution ratio to the output voltage is represented by equation (5). Therefore, the variant voltage $V_-$ caused by the vibration represented by the second term of equation (3) is indicated by equation (6).

$$\frac{\delta R_i}{R_i} = \pi E \varepsilon_i \quad (4)$$

$$\frac{R_f V_0}{R_i} = \frac{R_f h V_0}{\rho} \frac{W_i}{L_i} \quad (5)$$

$$v_+ = \sum_{i=1}^{n} \frac{\delta R_i}{R_i} \frac{R_f V_0}{R_i} \simeq \sum_{i=1}^{n} \pi E \varepsilon_i \frac{h R_f V_0}{\rho} \frac{W_i}{L_i} \quad (6)$$

where

ρ: resistivity;

πE: gauge coefficient;

$\varepsilon_1$: strain of the piezoresistor 6 in the i-numbered resonator beam 5; and $L_1, W_1, h$: the length, width and thickness of the piezoresistor 6 in the i-numbered resonator beam 5.

Therefore, it is understood from equation (6) that the variant voltage can be controlled by the strain ($\varepsilon_1$) of the piezoresistor 6 in each of the resonator beams 5. The magnitude of strain generated in the resonator beam 5 is different depending on portions of the resonator beam 5; therefore, the strain in the piezoresistor 6 is also changed depending on the installation position of the piezoresistor 6 in the resonator beam 5. Consequently, it is possible to control the strain in the piezoresistor 6 by adjusting the installation position thereof in the resonator beam 5. Thus, the installation position of the piezoresistor 6 in each of the resonator beams 5 relates to the variant voltage in each of the resonator beams 5. Since the gain of the variant voltage is dependent on the installation position of the piezoresistor 6 in this manner, it is possible to adjust the output gains of the resonator beams 5 for each of them by changing the position of the piezoresistor 6 to be installed in each resonator beam 5.

The following description will discuss a specific example of the installation position of the piezoresistor 6 in the resonator beam 5, which features the present invention.

Figure 6A:
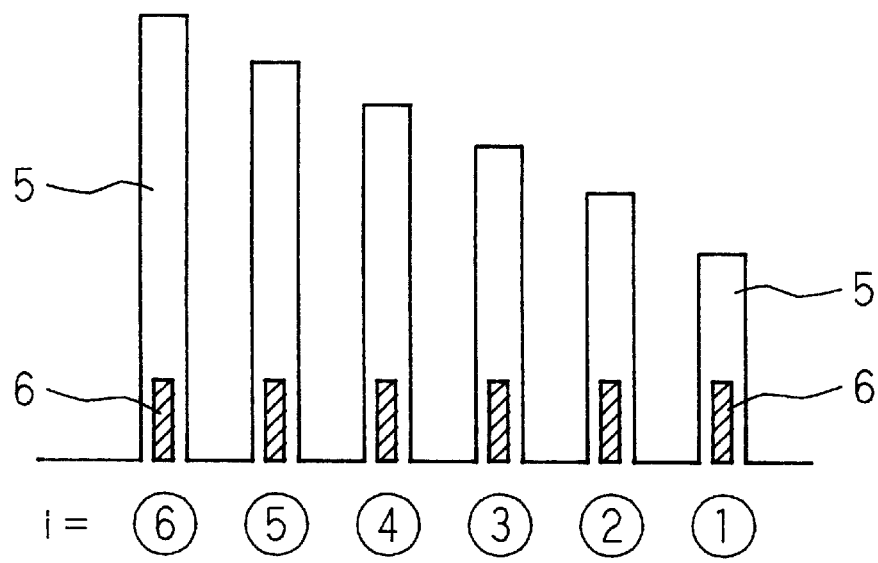
FIG. 6A is a plan view that shows the installation position of a piezoresistor in a vibration sensor which is used for comparison.

FIG. 6A is a plan view that shows one comparative example of the installation position of the piezoresistor 6 in an array-type vibration sensor. With respect to all the resonator beams 5 (i=① to ⑥), the installation position of the piezoresistor 6 is on the foot of the resonator beam 5 which has the greatest strain. In this case, even if the amplitude is the same, since the lengths of the respective resonator beams 5 are different, the magnitudes of strains in the piezoresistors 6 installed in the respective resonator beams 5 are different, with the result that their output signals are different depending on the respective resonator beams 5.

Figure 6B:
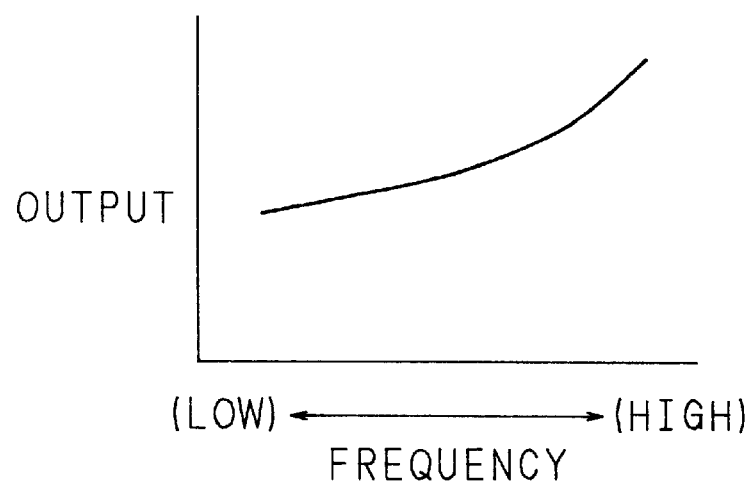
FIG. 6B is a graph that shows a frequency characteristic of an output signal level in the comparative example shown in FIG. 6A.

FIG. 6B shows the results of the levels of output signals in the comparative example. On the high-frequency side where the resonator beams 5 are shorter, since the strains are greater as compared with the low-frequency side where the resonator beams 5 are longer, the levels of the output signals become higher. In such a comparative example, since the levels of the output signals are different depending on the respective resonator beams 5, it is not possible to obtain a flat frequency characteristic.

Figure 7A:
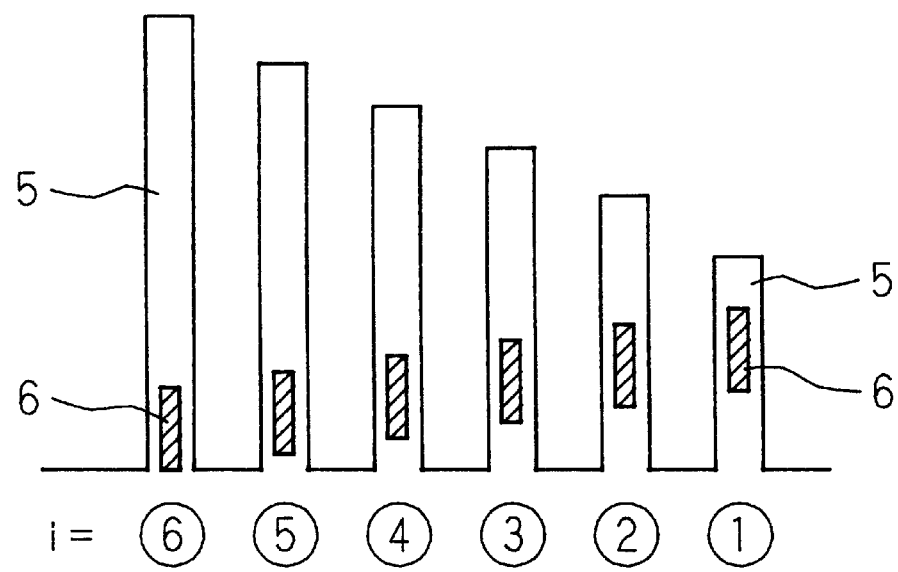
FIG. 7A is a plan view that shows one example of the installation position of the piezoresistor in the vibration wave detector according to the present invention.

FIG. 7A is a plan view that shows the installation position of the piezoresistor 6 in the vibration wave detector of the present invention which is designed to obtain a flat frequency characteristic. The piezoresistors 6 are installed at such positions as to make their strains on the respective resonator beams 5 (i=① through ⑥) equal to each other. In the case when vibration having the same amplitude occurs in a plurality of resonator beams 5 having different lengths, the strain is smaller on the resonator beam 5 having a longer length, while it is greater on the resonator beam 5 having a shorter length. Therefore, in order to make strains in all the piezoresistors 6 equal to each other, the piezoresistor 6 is installed in the proximity of the foot thereof in the case of the resonator beam 5 having a longer length, while the piezoresistor 6 is installed apart from the foot thereof in the case of the resonator beam 5 having a shorter length. In other words, with respect to the longest resonator beam 5 (i=⑥), the piezoresistor 6 is installed on the foot thereof where the strain is the greatest, and with respect to the resonator beams 5 (i=⑤ to ②) whose lengths become gradually shorter, the installation positions of the piezoresistors 6 are gradually spaced from the foot thereof; thus, with respect to the shortest resonator beam 5 (i=①), the piezoresistor 6 is installed at a position farthest from the foot thereof.

Figure 7B:
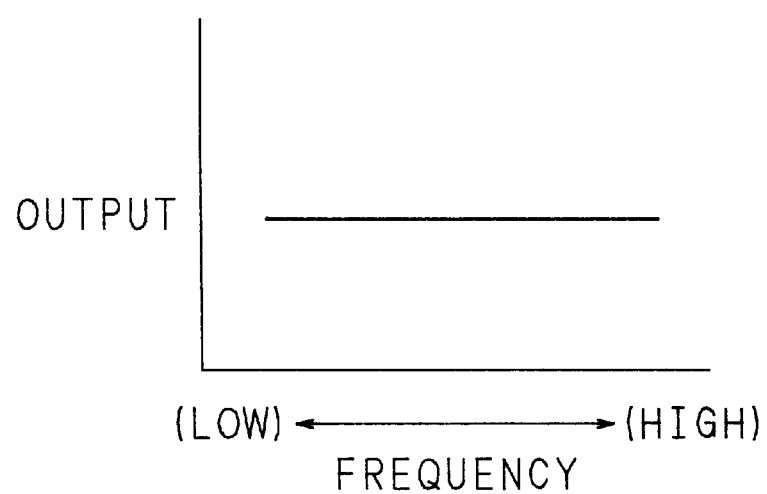
FIG. 7B is a graph that shows a frequency characteristic of an output signal level in the example shown in FIG. 7A.

FIG. 7B shows the results of levels of the output signals of the present example. Since strains in all the piezoresistors 6 are made equal to each other, the levels of the output signals are made constant over the entire frequency bands so that a flat frequency characteristic can be obtained.

Figure 8A:
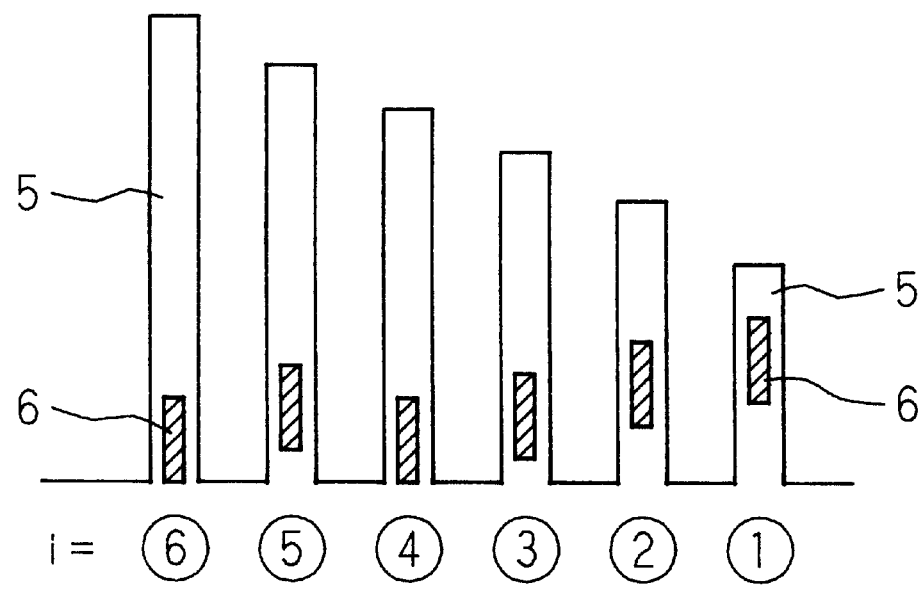
FIG. 8A is a plan view that shows another example of the installation position of the piezoresistor in the vibration wave detector according to the present invention.

FIG. 8A is a plan view that shows the installation position of the piezoresistor 6 in the vibration wave detector according to the present invention in which only an output gain of a specific frequency band is selectively increased. In this example, the output gain of an intermediate band is made higher than those of the other frequency bands. Among all the resonator beams 5 (i=① to ⑥), in those resonator beams 5 (i=③ and ④) having intermediate lengths, the installation positions of the piezoresistors 6 are set closer to the foot thereof as compared with the case of FIG. 7A. With respect to the other resonator beams 5, the piezoresistor 6 is installed in the proximity of the foot thereof in the case of the resonator beam 5 having a longer length (i=⑤, ⑥), while the piezoresistor 6 is installed apart from the foot thereof in the case of the resonator beam 5 having a shorter length (i=①, ②), in the same manner as FIG. 7A. By installing the piezoresistors 6 in this manner, strains in the piezoresistors 6 in the middle resonator beams 5 (i=③, ④) are made greater than those strains in the piezoresistors 6 in the resonator beams 5 (i=①, ②, ⑤, ⑥) at the ends.

Figure 8B:
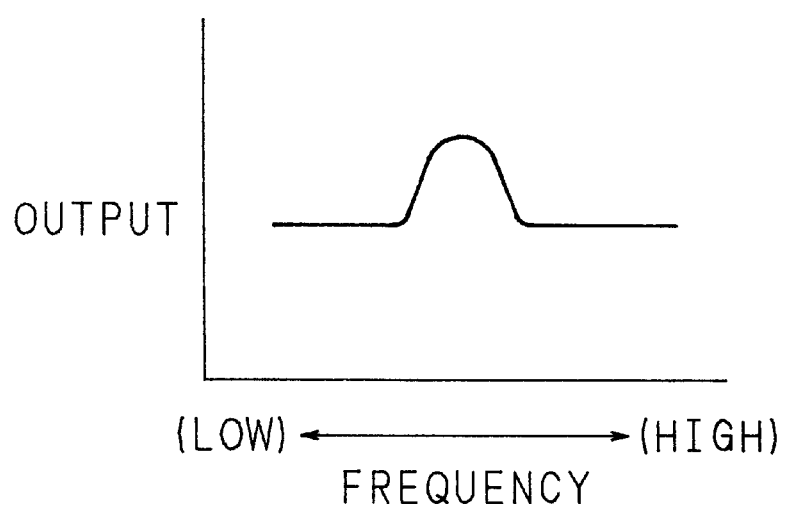
FIG. 8B is a graph that shows a frequency characteristic of an output signal level in the example shown in FIG. 8A.

FIG. 8B shows the results of levels of the output signals of the present example. The levels of output signals of the intermediate frequency band are made greater than those of the other frequency bands, making it possible to selectively increase the output gain of the intermediate band.

Here, in the above-mentioned example, an explanation was given of the case in which the output gain of the intermediate frequency band is selectively increased: however, by adjusting the installation position of the piezoresistor 6 in each of the resonator beams 5, it becomes possible to selectively increase the output gain of a predetermined frequency band, such as the low band or the high band, or to selectively decrease the output gain of a predetermined frequency band.

In the above-mentioned examples, explanations were given of cases in which strains caused by the resonance of the respective resonator beams are detected by piezo-elements (piezoresistors). In the following example, an explanation will be given of a capacitance system in which the strains are detected by capacitive elements.

Figure 9:
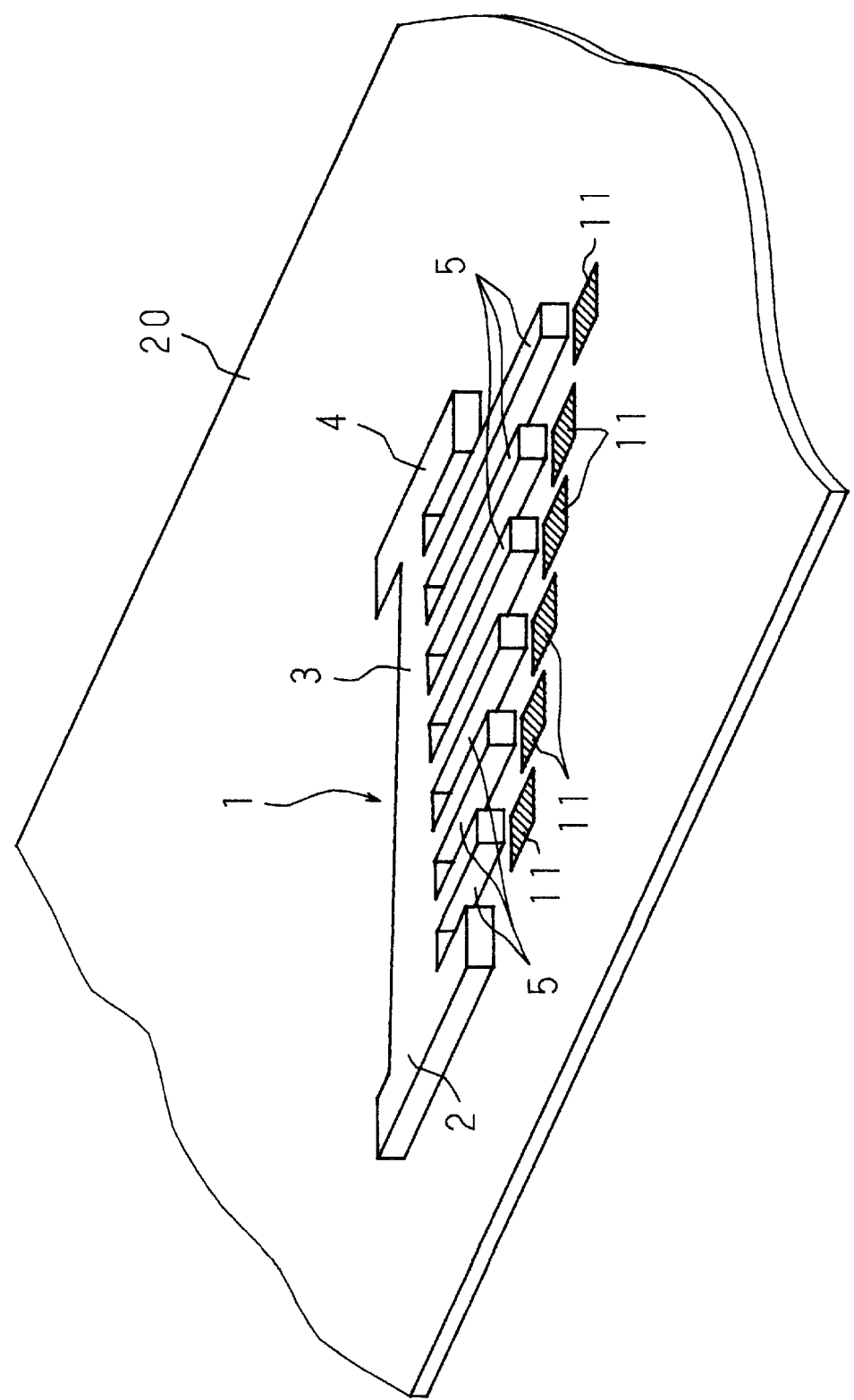
FIG. 9 is a perspective view that shows still another example of the vibration wave detector of the present invention.

FIG. 9 is a perspective view that shows a still another example of the vibration wave detector of the present invention. The arrangement of the sensor main body 1 shown in FIG. 9 is substantially the same as that of the above-mentioned example; therefore, the same members are indicated by the same reference numerals and the description thereof is omitted.

Electrodes 11 are formed on the semiconductor silicon substrate 20 at positions facing the tips of the respective resonator beams 5 so that a capacitor is formed by the tip of each resonator beam 5 and each electrode 11 facing it. The tip of each resonator beam 5 is a movable electrode the position of which is raised and lowered in response to the vibration, while the electrode 11 formed on the semiconductor silicon substrate 20 is a fixed electrode the position of which is not allowed to move. Here, when the resonator beam 5 vibrates at a specific frequency, the distance between the two electrodes varies, with the result that the capacity of the capacitor is changed.

Figure 10:
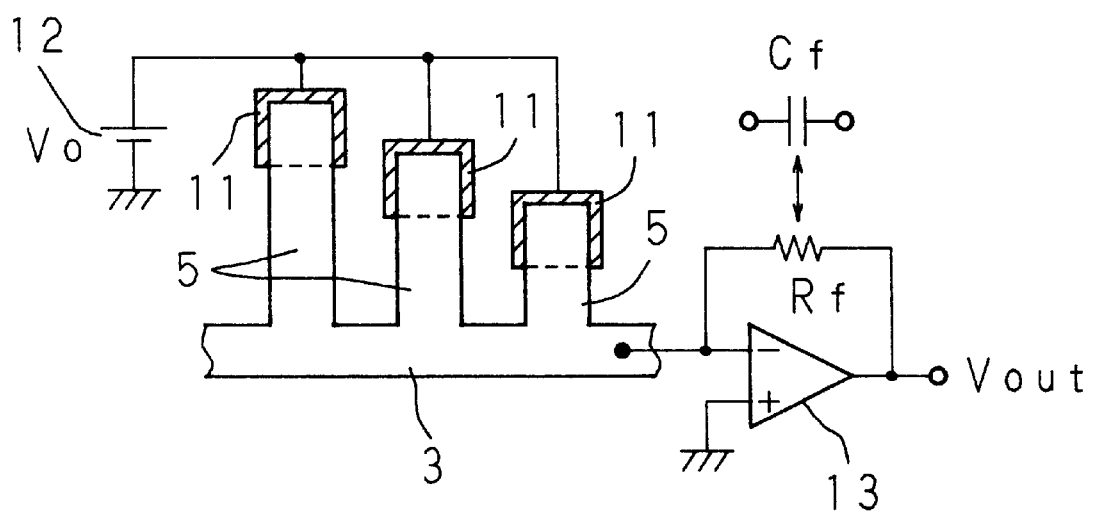
FIG. 10 is a circuit diagram that shows the other example of the vibration wave detector of the present invention.

FIG. 10 is a circuit diagram that explains this example (FIG. 9). A plurality of electrodes 11 are connected in parallel with one another, and one end of the parallel circuit is connected to a DC power supply 12 (voltage $V_0$). The transversal beam 3 is connected to the minus input terminal of an operational amplifier 13. The plus input terminal of the operational amplifier 13 is connected to ground. The voltage $V_0$ is commonly applied to all the electrodes 11 by the DC power supply 12. When a specific resonator beam 5 is allowed to resonate, the strain causes a change in the distance between the tip of the resonator beam 5 and the electrode 11 so that the capacity of the capacitor between them is changed; thus, the sum of these changes is gotten as an output (voltage $V_{out}$) of the operational amplifier 13.

In FIG. 10, a current I' that flows into an imaginary ground of the operational amplifier 13 is represented by equation (7).

$$I' = -\frac{d(\delta C V_0)}{dt} \quad (7)$$

$$= \frac{d}{dt} \sum_{i=1}^{n} \left(\frac{C_i V_0}{d_i}\right) \delta d_i$$

$$= \sum_{i=1}^{n} \left(\frac{C_i V_0}{d_i}\right)\left(\frac{d}{dt} \delta d_i\right)$$

where $d_i$: the distance between the i-numbered resonator beam 5 and the corresponding electrode 11;

$\delta d_i$: a minute change in the distance $d_i$ in response to a vibration;

$C_i$: a capacity in a stationary state between the i-numbered resonator beam 5 and the corresponding electrode 11;

$\delta C_i$: a minute change in the capacity $C_i$ in response to the vibration;

C: a capacity between the entire sensor main body 1 and the electrodes 11; and $\delta C$: a minute change in the capacity C in response to the vibration (more specifically, represented by equation (8)).

$$\delta C = \sum_{i=1}^{n} \delta C_i \approx \sum_{i=1}^{n} \left(\frac{C_i}{d_i}\right) \delta d_i \quad (8)$$

When a feedback is given as a capacitor, the output voltage $V_{out}$ of the operational amplifier 13 is given by equation (9), and the strain in each resonator beam 5 is taken out as a voltage.

$$V_{out} = -\frac{1}{C_f} \int I' dt \quad (9)$$

$$= -\sum_{i=1}^{n} \left(\frac{C_i V_0}{C_f d_i}\right) \delta d_i$$

where $C_f$: a feedback capacity.

In other words, as shown in the above-mentioned equation (9), resonance of the respective resonator beams 5 is outputted as the sum of variations. In contrast, when a feedback is given as a resistor, resonance of the respective resonator beams 5 is outputted as the sum of velocities.

It is understood from the above-mentioned equation (9) that in order to adjust the gain for each resonator beam 5 (each frequency band), any of the capacitor $C_1$, the distance $d_1$ and the minute change $\delta d_1$ in the distance may be changeable. The following description will discuss examples for adjusting the gain of each resonator beam 5 by changing the respective parameters.

Figure 11:
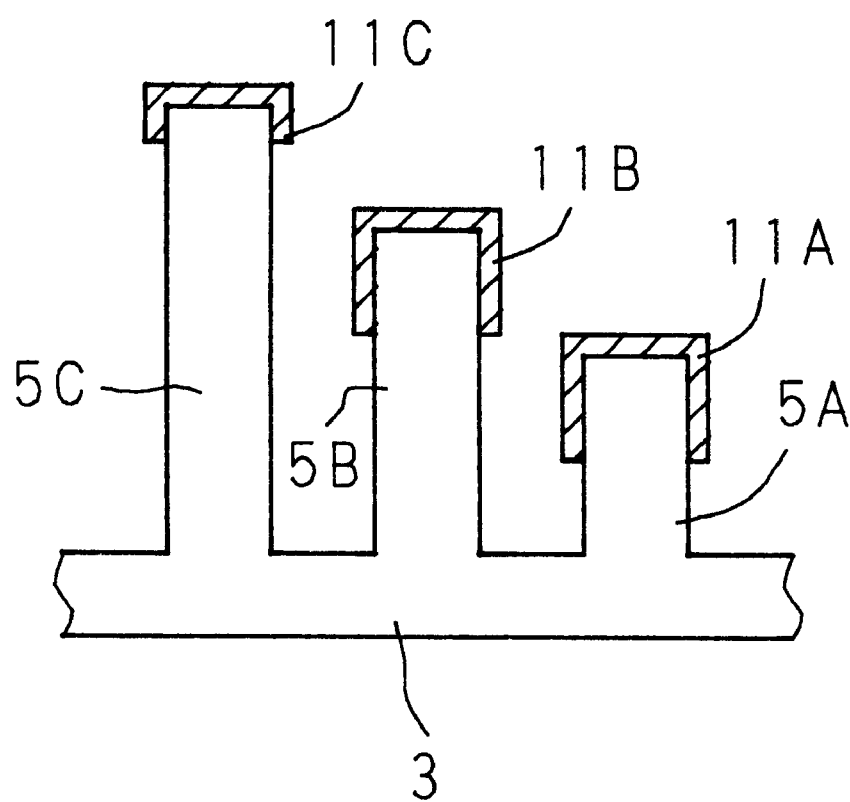
FIG. 11 is a plan view that shows an example in which capacitor $C_1$ is changeable.
Figure 12:
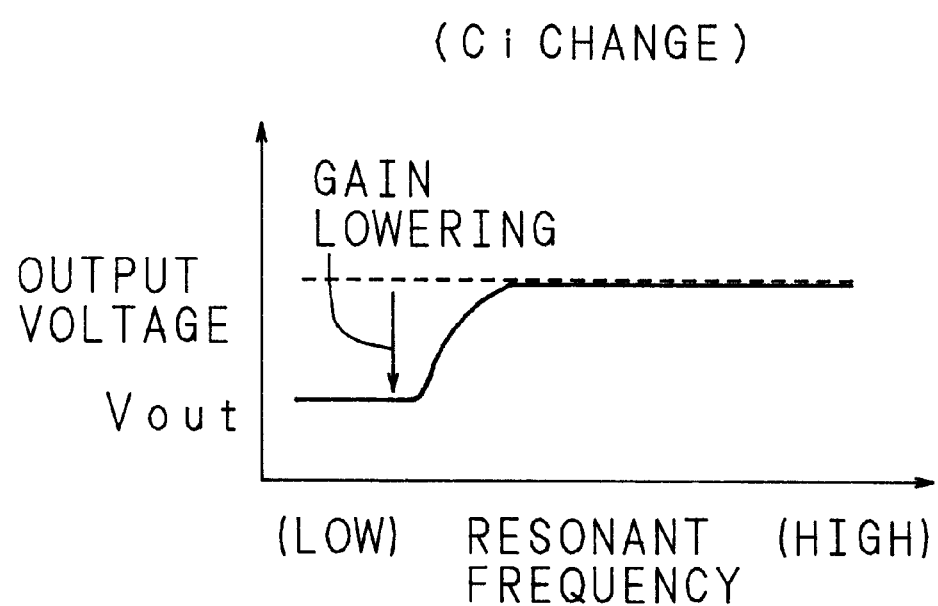
FIG. 12 is a graph that shows the relationship between the resonant frequency and the output voltage in the case where capacitor $C_1$ is changeable.

FIG. 11 is a plan view that shows an example in which the capacitor $C_1$ is changeable, and the area of an electrode 11C that corresponds to the longest resonator beam 5C among the three resonator beams 5A, 5B and 5C is made smaller than the area of each of electrodes 11A and 11B that relate to the other two resonator beams 5A and 5B. FIG. 12 shows the relationship between the resonant frequency and the output voltage $V_{out}$ in the above-mentioned case. Thus, the gain in the low-frequency area can be selectively made lower than the gains in the other frequency areas.

Figure 13A:
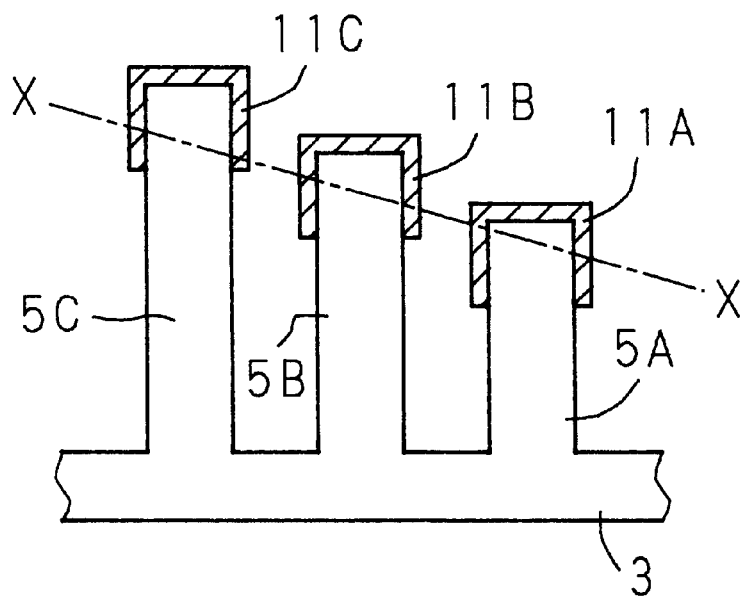
FIGS. 13A and 13B are a plan view and a cross-sectional view that respectively show an example in which distance $d_1$ is changeable.
Figure 13B:
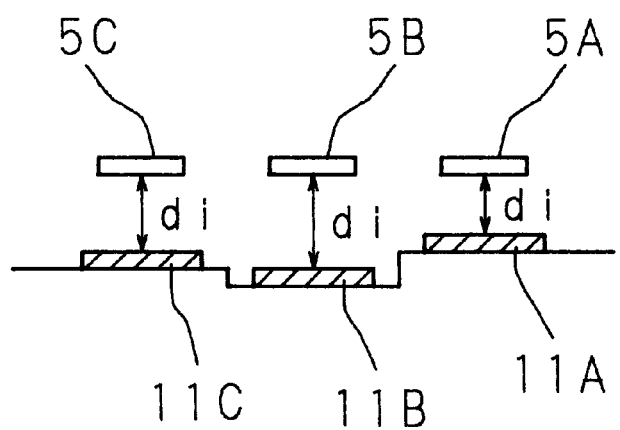
Figure 14:
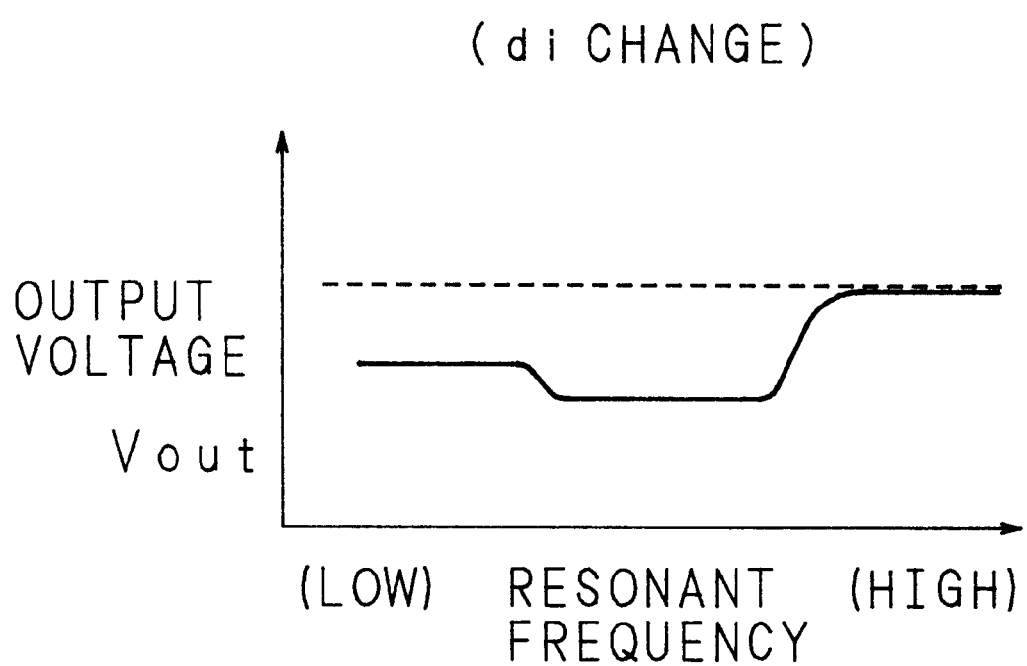
FIG. 14 is a graph that shows the relationship between the resonant frequency and the output voltage in the case where distance $d_1$ is changeable.

Moreover, FIG. 13A is a plan view that shows an example in which the distance $d_1$ is changeable, and FIG. 13B is a cross-sectional view taken along line X—X of FIG. 13A. The distance between the shortest resonator beam 5A among the three resonator beams 5A, 5B and 5C and the corresponding electrode 11A is made shortest, and the distance between the resonator beam 5B having an intermediate length and the corresponding electrode 11B is made longest. FIG. 14 shows the relationship between the resonant frequency and the output voltage $V_{out}$ in the above-mentioned case. Thus, the gain in the high-frequency area can be made highest, and the gain in the intermediate-frequency area can be made lowest. In this case, as can be seen from the above-mentioned equation (9), since the output voltage $V_{out}$ varies with the square of the distance $d_1$, a wider width of the gain adjustment can be obtained when the distance $d_1$ is changeable as described in the present embodiment.

Figure 15:
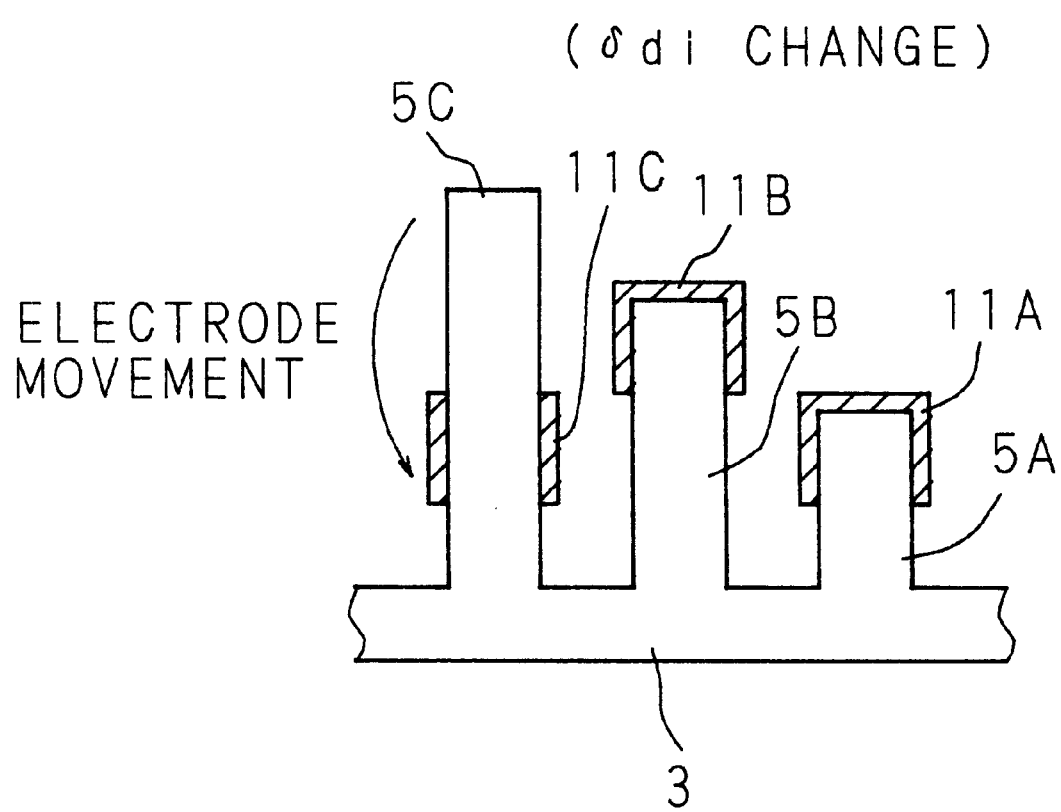
FIG. 15 is a plan view that shows an example in which minute change $\delta d_1$ in the distance is changeable.
Figure 16:
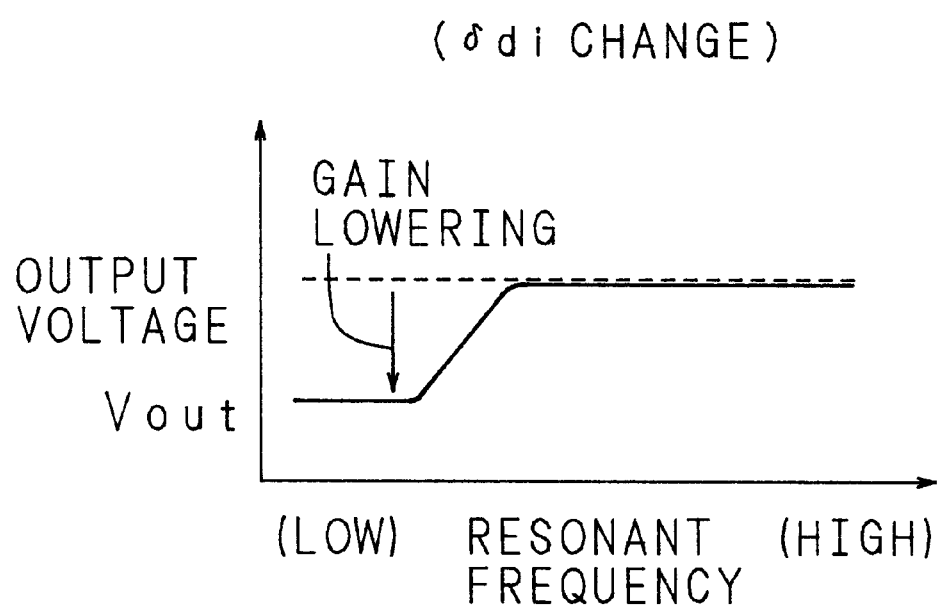
FIG. 16 is a graph that shows the relationship between the resonant frequency and the output voltage in the case where minute change $\delta d_1$ in the distance is changeable.

Furthermore, FIG. 15 is a plan view that shows an example in which the minute change $\delta d_1$ of the distance is changeable. Here, electrodes 11A and 11B corresponding to the two of the resonator beams 5A and 5B among the three resonator beams 5A, 5B and 5C are formed so as to face the tips of the resonator beams 5A and 5B, while an electrode 11C corresponding to the longest resonator beam 5C is formed so as to face the base end of the resonator beam 5C. With the formation of the electrode 11C at this position, even if a vibration having the same magnitude is generated in the resonator beam 5C, the minute change $\delta d_1$ becomes smaller as compared with the case in which the electrode 11C is formed so as to face the tip of the resonator beam 5C. FIG. 16 shows the relationship between the resonant frequency and the output voltage $V_{out}$ in the above-mentioned case. Thus, the gain in the low-frequency area can be selectively made lower than those in the other frequency areas.

Additionally, as in the case of the above-mentioned example (FIG. 3), even in the vibration wave detector using this capacitance system, the arrangement in which n number of pairs of the resonator beams 5, each pair having the same resonant frequency, are formed on both sides of the transversal beam 3 may of course be adopted, with the same effect that the gain adjustment of each resonator beam 5 can be carried out by changing the capacitor $C_1$, the distance $d_1$ and the minute change $\delta d_1$ in the distance.

Furthermore, in the present invention, an explanation was given by exemplifying an acoustic sensor that is responsive to a sound wave as the vibration wave; however, the same arrangement may of course be applied to vibration waves other than the sound wave so as to adjust the gain of the output.

As described above, in the present invention, the installation position of the piezoresistor in each of the resonators is adjusted so that the gain of an electric output of each of the resonators can be controlled depending on the installation position. Consequently, it becomes possible to carry out a gain setting for each frequency band of an inputted vibration wave by using a simple, inexpensive arrangement. Moreover, with an arrangement in which the piezoresistors are installed in the respective resonators at such positions as to make the magnitudes of their strains equal to each other, it becomes possible to realize a flat frequency characteristic which has not been achieved by conventional sensors.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vibration wave detecting method comprising:
   transmitting a vibration wave to be detected through a plurality of resonators, each having a different resonant frequency and being provided with a detector; and
   detecting an electric output generated by resonance of said each resonator at the resonant frequency by adjusting a gain of said electric output by using said each detector whose position is changeable.

2. The vibration wave detecting method according to claim 1, wherein
   the position of said each detector is changeable in a length direction of said each resonator.

3. The vibration wave detecting method according to claim 1, wherein
   said each detector is installed at a position where the detectors get a desired gain distribution for electric outputs of said respective resonators in accordance with a desired frequency characteristic.

4. The vibration wave detecting method according to claim 1, wherein
   said each detector is installed at a position where the detectors make gains of electric outputs of said respective resonators equal to each other.

5. The vibration wave detecting method according to claim 1, wherein
   said each detector is a strain detecting element.

6. The vibration wave detecting method according to claim 1, wherein
   said each detector is a capacitive element.

7. The vibration wave detecting method according to claim 6, wherein
   said capacitive element has opposing electrodes the distance of which is changeable.

8. The vibration wave detecting method according to claim 1, wherein
   said each detector is a piezoresistor.

9. A vibration wave detector comprising:
   a plurality of resonators, each resonating at each different specific frequency; and
   a plurality of detectors, each being installed in each resonator, and each detecting an electric output generated by resonance of each resonator at said frequency due to a vibration wave to be detected that has been transmitted to each resonator;
   wherein each detector is installed at a position that is determined depending on a distribution of magnitude of strain of each resonator.

10. The vibration wave detector according to claim 9, wherein
    said each detector is installed at a predetermined position in a length direction of said each resonator that a desired gain of an electric output from said each resonator is obtained.

11. The vibration wave detector according to claim 9, wherein
    said each detector is installed at a position where the detectors make gains of electric outputs of said respective resonators equal to each other.

12. The vibration wave detector according to claim 9, wherein
    said each detector is a strain detecting element.

13. The vibration wave detector according to claim 9, wherein
    said each detector is a capacitive element.

14. The vibration wave detector according to claim 13, wherein
    said capacitive element has opposing electrodes the distance of which is set at a predetermined length.

15. The vibration wave detector according to claim 9, wherein
    said each detector is a piezoresistor.

16. The vibration wave detector according to claim 9, further comprising:
    a circuit for applying a voltage to one end of said each detector; and
    a circuit for getting an electric output from the other end of said each detector and for amplifying the electric output.

17. A vibration wave detector comprising:
    a vibration-wave input section for receiving a vibration wave to be detected;
    a plurality of resonators each of which resonates at a different specific frequency;
    a transmitting section for transmitting the vibration wave received by said vibration-wave input section to said resonators; and
    a plurality of detectors each of which detects an electric output generated by resonance of each resonator at said frequency due to the vibration wave that has been transmitted to each resonator;
    wherein said each detector is installed at a predetermined position of each resonator that a desired gain of an electric output from each resonator is obtained.

18. The vibration wave detector according to claim 17, wherein
    said each detector is installed at a position where the detectors make gains of electric outputs of said respective resonators equal to each other.

19. The vibration wave detector according to claim 17, wherein said each detector is a strain detecting element.

20. The vibration wave detector according to claim 17, wherein said each detector is a capacitive element.

21. The vibration wave detector according to claim 17, wherein said each detector is a piezoresistor.

\* \* \* \* \*